United States Patent [19]

Mashimo et al.

[11] Patent Number: 4,852,625
[45] Date of Patent: Aug. 1, 1989

[54] TIRE FOR TWO-WHEELED VEHICLE IN WHICH INDIVIDUAL CORD BELTS CONTAIN BOTH ADHESIVE AND REINFORCING CORDS

[75] Inventors: Satoshi Mashimo; Tatsuya Kitajima; Masayuki Tanaka; Shinji Kuramoto, all of Hyogo, Japan

[73] Assignee: Mitsubishi Belting Ltd., Japan

[21] Appl. No.: 201,352

[22] Filed: May 25, 1988

Related U.S. Application Data

[63] Continuation of Ser. No. 721,518, Apr. 9, 1985, abandoned.

[30] Foreign Application Priority Data

| Apr. 10, 1984 | [JP] | Japan | 59-52987[U] |
| Apr. 17, 1984 | [JP] | Japan | 59-57073[U] |
| Apr. 18, 1984 | [JP] | Japan | 57468[U] |
| Jun. 19, 1984 | [JP] | Japan | 59-92331[U] |
| Sep. 11, 1984 | [JP] | Japan | 59-138074[U] |

[51] Int. Cl.$^4$ .............................................. B60C 9/13
[52] U.S. Cl. .................................... 152/511; 152/557
[58] Field of Search .............. 152/192, 511, 512, 548, 152/539, 451, 553, 556, 557, 564; 156/118, 121, 123; 57/902, 237

[56] References Cited

U.S. PATENT DOCUMENTS

| 1,913,422 | 6/1933 | Wikle | 156/121 |
| 2,468,304 | 4/1949 | Musselman | 57/902 X |
| 3,677,318 | 7/1972 | Glass et al. | 152/556 |
| 3,692,080 | 9/1972 | Boileau | 152/557 X |
| 3,977,172 | 8/1976 | Kerawalla | 57/237 |
| 4,155,394 | 5/1979 | Shepherd et al. | 152/556 |
| 4,177,852 | 12/1979 | Merli et al. | 152/539 X |
| 4,274,899 | 6/1981 | Duttlinger | 152/512 X |
| 4,293,018 | 10/1981 | Dubois | 152/511 X |
| 4,389,839 | 6/1983 | van der Werff | 57/902 X |

FOREIGN PATENT DOCUMENTS

| 0373902 | 4/1923 | Fed. Rep. of Germany | 152/451 |
| 2337052 | 9/1977 | France | 152/557 |
| 60-35607 | 2/1985 | Japan | 152/451 |

Primary Examiner—Raymond Hoch
Attorney, Agent, or Firm—Sughrue, Mion, Zinn, Macpeak & Seas

[57] ABSTRACT

A tire for a two-wheeled vehicle, particularly, a bicycle intended for a racing purposes having an improved running stability, superior durability and impact resistance, and reduced weight. The tire includes a carcass layer formed by arranging cord belts with a rubber paste coated thereon in such a manner that the cords of the cord belts cross each other. A tube is fitted to the inside of the carcass layer, and a rubber tread portion is bonded to the outer periphery of the carcass layer. The cord belt is produced in bias form with alternately arranged cords superior in durability and impact resistance and cords superior in adhesion with rubber. The two types of cords may be equal in number, or a majority of one of the two types of cords employed, depending upon the precise application of the tire and the conditions under which it is intended for use.

2 Claims, 2 Drawing Sheets

4,852,625

TIRE FOR TWO-WHEELED VEHICLE IN WHICH INDIVIDUAL CORD BELTS CONTAIN BOTH ADHESIVE AND REINFORCING CORDS

This is a continuation of application Ser. No. 721,518 filed Apr. 9, 1985 now abandoned.

BACKGROUND OF THE INVENTION

The present invention relates to tires for two-wheeled vehicles. More particularly, the invention is concerned with tires for two-wheeled vehicles which produce reduced vibration during running, have superior running stability, are lightweight, and, furthermore, are superior in durability and impact resistance.

Requirements for tires for two-wheeled vehicles, especially tires for racing bicycles, include reduced vibration (with respect to ordinary tires of the same general type) during running, good running stability, light weight, and the ability to withstand high-speed running.

These characteristics are required particularly for racing bicycles. For racing, circular tires having a ring-like form in cross section are ordinarily employed. Minimizing the running resistance is of course the primary concern for this purpose. Efforts have been made to produce lightweight tires by reducing the thickness of the tread rubber. Such minimization of running resistance and reduction of weight are also of value for ordinary bicycle tires.

Reducing the thickness of the tread rubber, however, increases the danger of puncturing the tire if a large impact is applied thereto or if the tire is run over a sharp-pointed object such as broken glass, a nail, or the like. In order to overcome this problem, a fabric, for example, of aromatic polyamide or polyester fibers, can be inserted as a reinforcing material between the tread rubber and the carcass layer. This reinforcing material, however, increases the weight of the tire and the running resistance. Moreover, if the adhesion between the reinforcing material and the carcass layer or between the reinforcing material and the tread rubber is poor, layer separation between the reinforcing material and the carcass layer or between the reinforcing material and the tread rubber can occur during running. In addition, a problem arises in that the durability of the tire is reduced by fatigue deterioration of the reinforcing material due to compression and stretching.

SUMMARY OF THE INVENTION

Taking into consideration the advantages and disadvantages of employing the reinforcing material such as good durability but poor adhesion between the reinforcing material and the tread rubber or carcass layer, it is an object of the present invention to provide tires for two-wheeled vehicles which are lightweight, have superior running stability, and are superior in durability and impact resistance. Another object of the present invention is to overcome the above-described problems by avoiding the use of reinforcing material.

In accordance with the above and other objects, the present invention provides a tire having a tire carcass portion made using a cord belt produced by arranging a number of cords parallel to each other, and in which the cords are made of fibers superior in durability and impact resistance and fibers superior in adhesion with the tread rubber.

One of the cord belts which can be used to form the tire carcass of the invention is composed of two different types of cords, one being superior in durability and impact resistance and the other superior in adhesion with rubber. The cords are arranged in bias form so that the two types of cords alternate, either cord by cord or a single cord by group of predetermined numbers. In an alternative embodiment, core yarns are employed composed of a core thread superior in durability and impact resistance and fibers superior in adhesion with rubber wound on the core thread. In this case, cords superior in adhesion with rubber are arranged in a bias form with the core yarns in such a manner that the core yarns and the cords alternate one by one, or one by group of predetermined numbers. In another cord belt, core yarn cords, doubled and twisted cords, or mixed and spinned cords of fibers superior in durability and impact resistance and fibers superior in adhesion with rubber are placed parallel with each other and arranged in a bias form.

DESCRIPTION OF THE PREFERRED EMBODIMENTS

The present invention is described in greater detail with reference to the accompanying drawings.

Figure 1A:
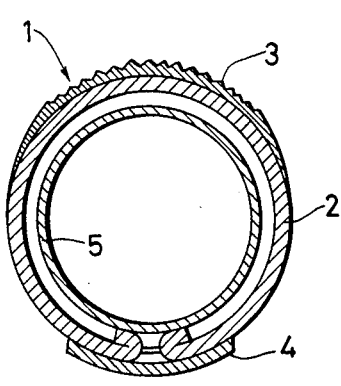
FIG. 1A is a cross-sectional view of a circular tire for a bicycle of the present invention.

FIG. 1A is a cross-sectional view of a circular tire for a bicycle of the present invention. The basic structure of the tire is similar to that of the conventional circular tire. The circular tire, which is ring-like in cross section, is made up of a carcass layer 2 that is produced by superposing a plurality of cord belts 6 (described below in more detail with reference to FIGS. 2A to 2C, 3A to 3C, and 5) with a rubber paste coated thereon or with a rubber sheet provided thereon in such a manner that the cords are arranged in bias form, crossing each other. A rubber tread portion 3 is provided on the outer periphery of the circular tire 1. On the inner periphery of the circular tire 1 which comes in engagement with a rim, a protective tape 4 made of a thin fabric is provided. A tube 5 is fitted to the inside of the carcass layer 2.

Figure 1B:
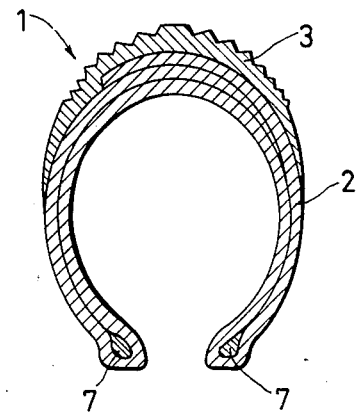
FIG. 1B is also a cross-sectional view of a bead-type tire for a bicycle of the present invention.

FIG. 1B is a cross-sectional view of a bead-type tire 1' for a bicycle of the present invention. The basic structure of the tire 1' is substantially the same as that of the conventional tire. A cord belt 6 with a rubber paste coated thereon or with a rubber sheet provided thereon is turned around bead wires 7 and 7', thus forming a carcass layer 2. At the side coming into contact with the ground, the cord belt 6 with overlapped portions at both sides forms a superposed zone of three plies. In the bent and overlapped cord belts, the cords are arranged so as to cross each other. The carcass layer 2 is provided with a tread portion 3 at the surface which comes into contact with the ground.

FIGS. 2A, 2B, 2C, 3A, 3B, 3C, and 5 are enlarged plan views of portions of various embodiments of cord belts of the invention used in the carcass layer 2. Cords constituting the belt 6 are made of fibers A superior in durability and impact resistance, such as aromatic polyamide fibers, and of fibers B superior in adhesion with the rubber composition, such as cotton, silk, polyester, or aliphatic polyamide fibers. The cords of two kinds of fibers A and B having different properties are arranged in bias form, and parallel to each other in a plane.

Figure 2A:
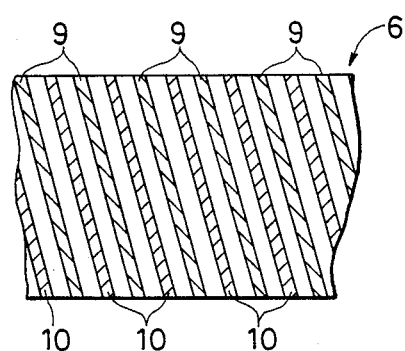
FIG. 2A is an enlarged plan view of a part of a cord belt constituting a carcass layer.
Figure 2B:
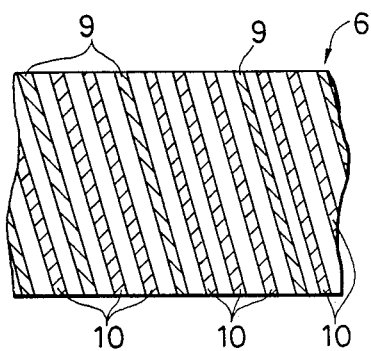
FIGS. 2B, 2C, 3A, 3B, 3C, and 5 represent other embodiments in views similar to FIG. 2A.
Figure 2C:
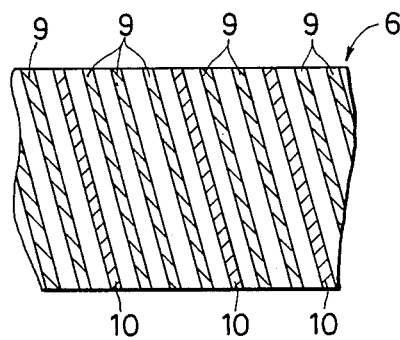

FIGS. 2A to 2C illustrate an embodiment in which the belt is made up of cords 9 and 10 of fibers A and B, respectively, Preferably, the cords 9 and 10 are arranged alternately, as depicted in FIG. 2A.

Depending on the use of the tire, for instance, if adhesion to the rubber composition is of greatest importance, the cords 9 and 10 are arranged so that one of the cords 9 is provided for a plurality of the cords 10 (FIG. 2B), or if impact resistance is of primary concern, the cords 9 and 10 are arranged so that one of the cords 10 is provided for a plurality of the cords 9 (FIG. 2C).

Figure 3A:
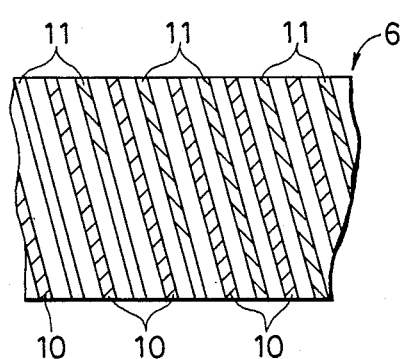
Figure 3B:
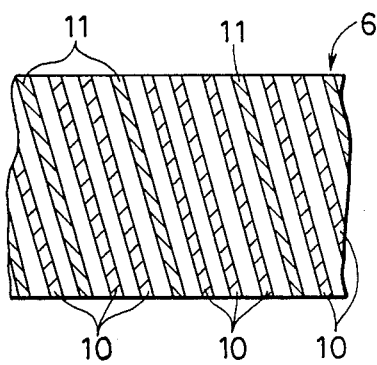
Figure 3C:
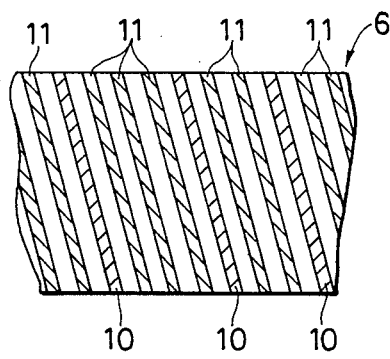
Figure 4:
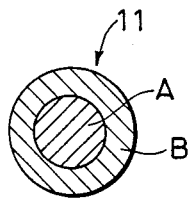
FIGS. 4, 6A, 6B, and 6C are enlarged cross-sectional views of a core yarn cord, a doubled and twisted cord, and a mixed and spinned cord.

FIGS. 3A to 3C illustrate an embodiment in which the belt is made up of core yarn cords 11 which, as illustrated in FIG. 4, are made up of two fibers A and B having different properties. Specifically, each core yarn is composed of a core thread made of aromatic polyamide fibers A and fibers B superior in adhesion with the rubber composition wound on the core thread, and single cords 10. In this case, preferably, the cords 10 and 11 are arranged alternately as shown in FIG. 3A. If, however, as in the above case, adhesion with the rubber composition is of main importance, the core yarns 11 and cords 10 are arranged so that one of the core yarns 11 is provided for a plurality of cords 10 (FIG. 3B), or, if impact resistance is of main importance, the cords are arranged so that one of the cords 10 is provided for a plurality of the core yarns 11 (FIG. 3C).

Figure 5:
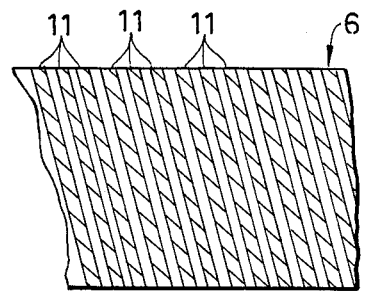
Figure 6A:
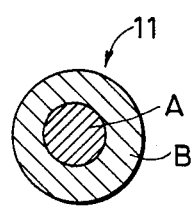
Figure 6B:
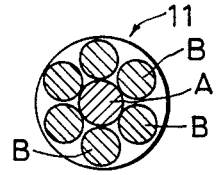
Figure 6C:
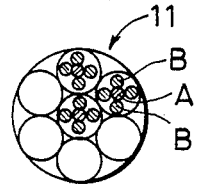

FIG. 5 illustrates an embodiment in which two kinds of fibers A and B, namely, core yarn cords 11 composed of a core thread of aromatic polyamide fibers A and fibers B superior in adhesion with the rubber composition wound on the core thread (FIG. 6A), doubled and twisted cords 11 made of two kinds of fibers (FIG. 6B), or mixed and spun cords 11 produced by mixing and spinning two kinds of fibers (FIG. 6C) are used singly.

In connection with two kinds of fibers A and B constituting the mixed and spinned cords 11, it is desirable that they should be mixed in a weight ratio $A/B = 10/90$ to $90/10$. If the mixing ratio is less than 10/90, the puncture resistance against pieces of broken glass, nails, or metal pieces, for example, is unacceptably low. On the other hand, if the ratio is more than 90/10, the adhesion to the rubber composition is reduced.

In order to increase the adhesion between the cord belt 6 and the tread rubber 3 and to prevent opening of the cord belt 6, a sufficient amount of a rubber paste or a rubber sheet is provided.

In the tire for two-wheeled vehicles of the present invention, the cord belt constituting the carcass layer is made up of cords of fibers superior in durability and impact resistance and fibers superior in adhesion with the rubber composition, or combinations thereof. Thus, puncture due to impact or penetration of sharp-pointed materials such as pieces of broken glass, nails, and metal pieces through the tube is prevented by the fibers superior in durability and impact resistance. Aromatic polyamide fibers are preferred for these fibers. Good adhesion between the tread rubber and the carcass layer, preventing the peeling, fatigue deterioration over long periods of time, can be attained by cotton, silk, polyester or aliphatic polyamide fibers. Moreover, since no reinforcing material is used in the tire of the present invention, the tire is light in weight and has a low running resistance. Moreover, the materials constituting the cord belt forming the carcass layer, which is an essential constituent of the tire for a bicycle, are made of a plurality of fibers having different properties. Thus, if necessary, the thickness of the tread rubber can be reduced without loss of running stability and durability of the tire itself. In this respect, the present invention provides a tire for a bicycle having a greatly reduced weight and running resistance.

We claim:

1. A tire (1) for a two-wheeled vehicle, comprising: a carcass layer (2) formed in a desired shape by arranging cord belts (6) with a rubber paste coated thereon in such a manner that cords of respective ones of said cord belts cross each other, a tube (5) fitted to an inside of said carcass layer, and a rubber tread portion (3) bonded to an outer periphery of said carcass layer, wherein each of said cord belts includes first cords made of aromatic polyamide fibers and second cords comprising at least one of cotton, silk, polyester, and aliphatic polyamide fibers, said first cords (9) being superior in durability and impact resistance relative to said second cords, said second cords (10) being superior in adhesion with rubber relative to said first cords, said first and second cords being individually alternately arranged and being in a bias form.

2. A tire (1) for a two-wheeled vehicle, comprising: a carcass layer (2) formed in a desired shape by arranging cord belts (6) with a rubber paste coated thereon in such a manner that cords of respective ones of said cord belts cross each other, a tube (5) fitted to an inside of said carcass layer, and a rubber tread portion (3) bonded to an outer periphery of said carcass layer, wherein each of said cord belts includes first cords made of aromatic polyamide fibers and second cords consisting essentially of at least one of cotton, silk, polyester, and aliphatic polyamide fibers, said first cords (9) being superior in durability and impact resistance relative to said second cords, said second cords (10) being superior in adhesion with rubber relative to said first cords, said first and second cords being individually alternately arranged and being in a bias form.

* * * * *